TWO DIMENSIONAL SELECTION SYSTEM FOR READ ONLY MEMORY

Filed Feb. 23, 1962 3 Sheets-Sheet 1

INVENTOR
HENRY R. FOGLIA

BY Thomas & Crickenberger
ATTORNEYS

May 25, 1965 H. R. FOGLIA 3,185,967

TWO DIMENSIONAL SELECTION SYSTEM FOR READ ONLY MEMORY

Filed Feb. 23, 1962 3 Sheets-Sheet 2

TWO DIMENSIONAL SELECTION SYSTEM FOR READ ONLY MEMORY

Filed Feb. 23, 1962 3 Sheets-Sheet 3

United States Patent Office 3,185,967
Patented May 25, 1965

3,185,967
TWO DIMENSIONAL SELECTION SYSTEM FOR READ ONLY MEMORY

Henry R. Foglia, Briarcliff Manor, N.Y., assignor to International Business Machines Corporation, New York, N.Y., a corporation of New York Filed Feb. 23, 1962, Ser. No. 175,076
1 Claim. (Cl. 340—173)

This invention relates to memory devices and more particularly to memory devices utilizing punched cards.

In data handling devices which utilize high speed memories there customarily are provided memory systems which perform read and write operations where new data is constantly being supplied and processed. It is often necessary in processing data to refer to statistical information, tables of values and other information which either remains unchanged or, if changed, is seldom changed. For the purpose of storing such information it is convenient to utilize a memory device wherein the data is permanently stored, and the memory device is operated for reading purposes only. The present invention is concerned with memory devices of the type which are employed for reading purposes only.

There is provided according to the present invention an improved memory arrangement which utilizes punched cards in a matrix arrangement having columns and rows, and the number of cards employed may be increased to provide a large volume of data in permanent storage.

It is a feature of this invention to provide a punched card memory device wherein the power driving equipment for supplying signals to selected columns and rows is minimized, consequently reducing the number of components required and reducing costs.

It is another feature of this invention to provide an improved memory device wherein the signal to noise ratio is favorably large.

According to one arrangement of this invention a plurality of cards having data manifesting perforations therein are arranged in columns and rows with horizontal lines disposed in alignment with the rows of the cards and groups of vertical lines, one group of vertical lines for each column, the groups of lines for each column being disposed in alignment with the columns of the cards. Sensing devices coupled to the corresponding vertical lines of each group of vertical lines responds to signals on the vertical lines for indicating information. The signals on the vertical lines may be modified by a signal on a selected horizontal line being capacitively coupled through perforations in a card to the selected vertical lines. Unilateral conducting devices coupled between non-selected vertical lines and the associated sensing devices are reverse biased for the purpose of reducing noise signals, thereby improving the signal to noise ratio of the selected vertical lines.

Figure 1:
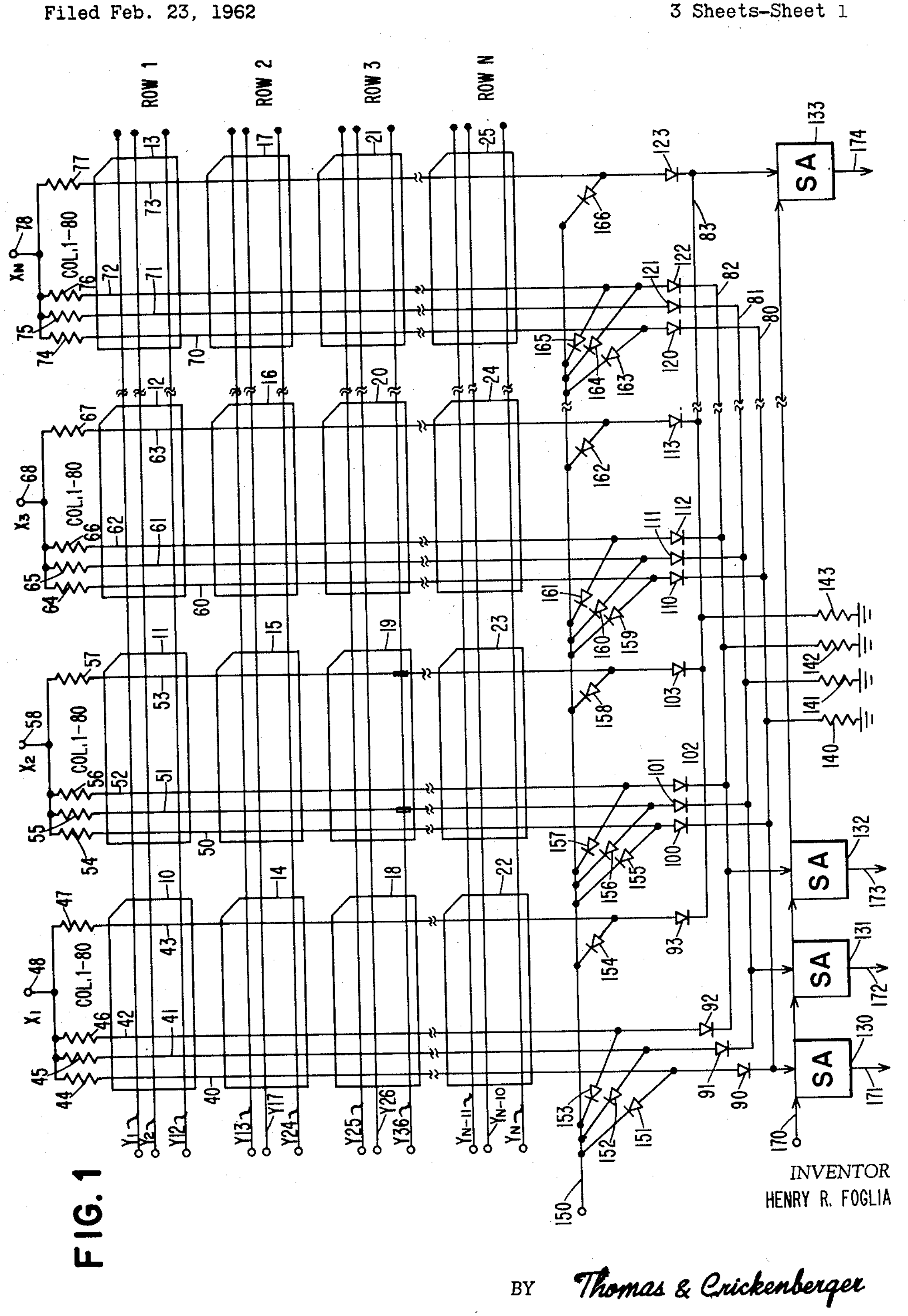
Figure 2:
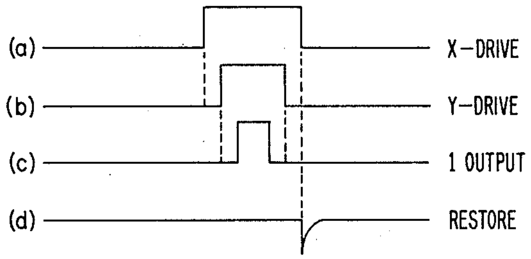
Figure 4:
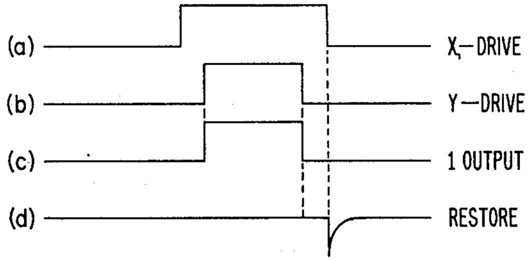
Figure 5:
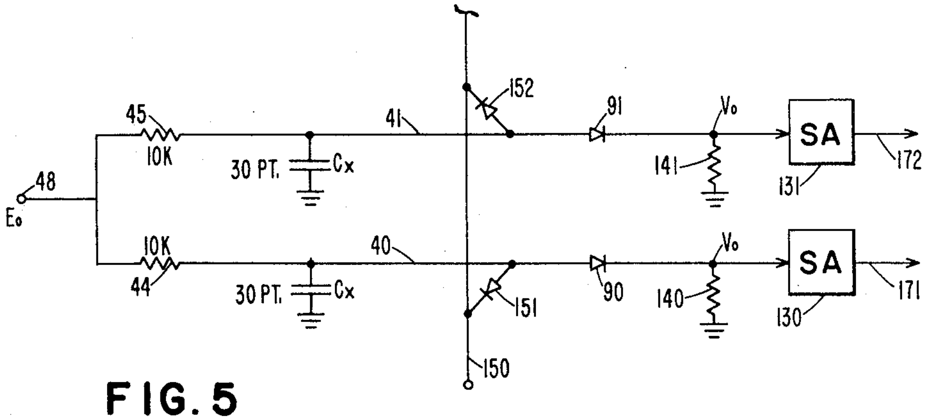
Figure 3:
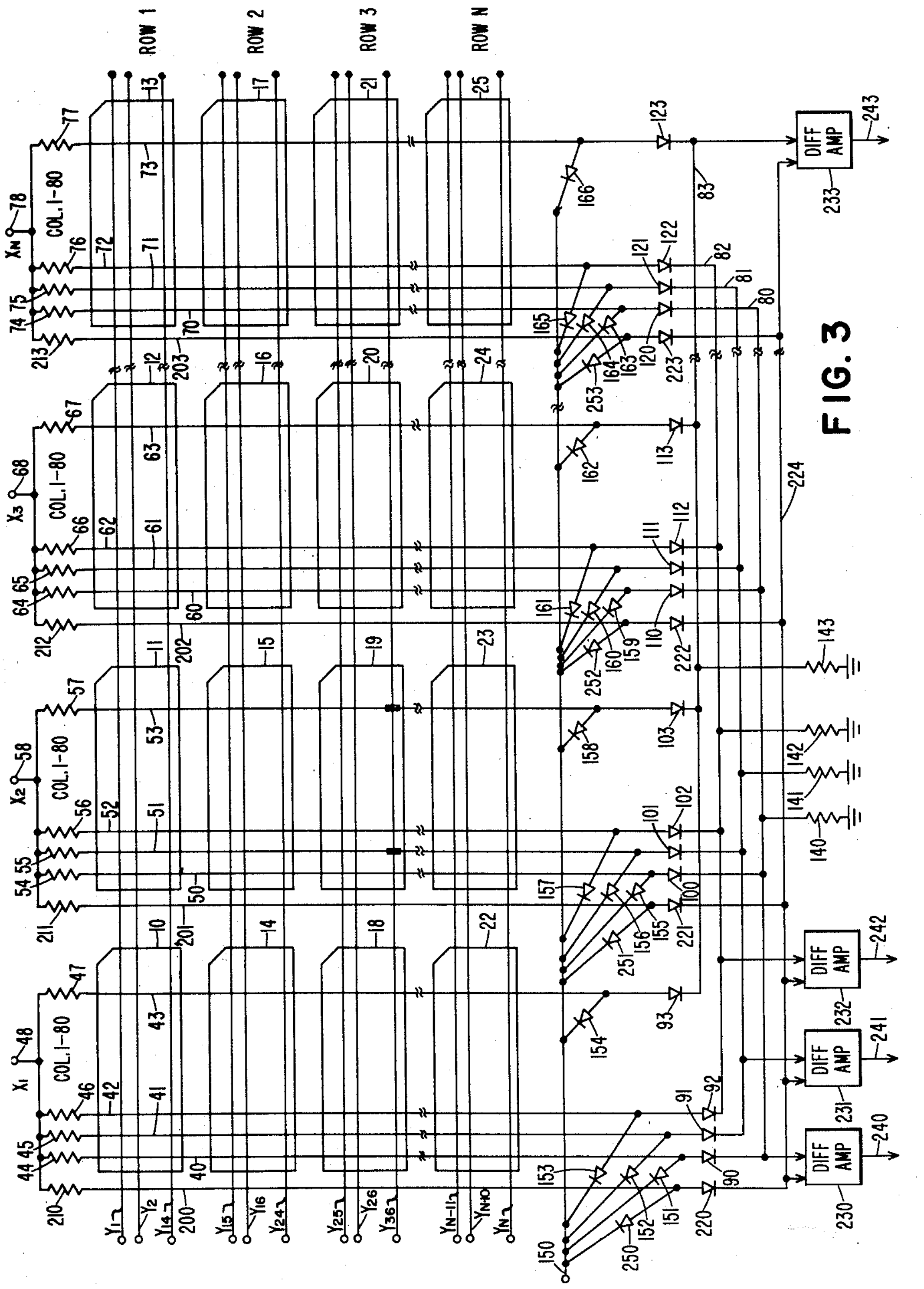

The foregoing and other objects, features and advantages of the invention will be apparent from the following more particular description of preferred embodiments of the invention, as illustrated in the accompanying drawings in which:

FIG. 1 illustrates one arrangement of a read-only memory according to this invention, FIG. 2 illustrates curves useful in explaining the operation of the memory arrangement of FIG. 1, FIG. 3 illustrates another arrangement of a read-only memory according to this invention, FIG. 4 illustrates curves useful in explaining the operation of the memory arrangement of FIG. 3, and FIG. 5 illustrates an equivalent circuit of a portion of the memory arrangement in FIG. 1.

Referring first to FIG. 1, a matrix arrangement is illustrated having cards disposed in columns and rows. Cards 10 through 13 are disposed in columns $X_1$ through $X_n$, and these cards constitute row 1. Cards 14 through 17, 18 through 21 and 22 through 25 are disposed in columns $X_1$ through $X_n$ as shown, and they constitute respective rows 2 through 4.

The cards shown in FIG. 1 are preferably of the type illustrated and described in copending application Serial No. 823,997 for Memory Device and Element by William L. McDermid et al., filed on June 30, 1959 and later abandoned. As illustrated in the above-mentioned application binary information is represented by the presence or absence of a hole in the cards, and X and Y drive lines are disposed on opposite sides of the cards in alignment with all holes which may be present. The cards in this application are shown disposed below the X and Y drive lines for convenience of illustration although in practice the cards are disposed between the X and Y drive lines. Each card preferably has eighty columns and twelve rows in which binary information may be represented.

The cards in FIG. 1 have twelve Y lines disposed over the twelve rows in each card and eighty vertical lines disposed over the eighty columns. Cards 10 through 13 in row 1 have line $Y_1$ disposed over row 1 of each of these cards. A line $Y_2$ is disposed over row 2 of each of the cards 10 through 13; line $Y_3$ through line $Y_{11}$ are omitted in the interest of simplicity, and a line $Y_{12}$ is disposed over row 12 in each of the cards 10 through 13. The cards 14 through 17 in row 2 of the matrix array in FIG. 1 have lines $Y_{13}$ and $Y_{14}$ disposed over respective rows 1 and 2 of these cards, and line $Y_{24}$ is disposed over row 12 of each of these cards, the lines $Y_{15}$ through $Y_{23}$ being omitted. In like fashion row 3 through row N are illustrated with Y lines disposed over rows 1, 2 and 12 of each card.

The cards 10, 14, 18 and 22 in column $X_1$ in FIG. 1 have eighty vertical lines disposed over the eighty columns in each card. The line 40 is disposed over column 1 of the cards 10, 14, 18 and 22. The line 41 is disposed over column 2 of the cards 10, 14, 18 and 22. The line 42 is disposed over column 3 of each of these cards, and the line 43 is disposed over column 80 of the cards 10, 14, 18 and 22, the lines for columns 4 through 79 being omitted in the interest of simplicity. Resistors 44 through 47 are connected between respective lines 40 through 43 and an input terminal 48. The resistors 44 through 47 have the same resistance value, and a signal applied to the terminal 48 is divided equally between the vertical lines for the eighty columns whereby signals of equal amplitude appear on the lines 40 through 43.

In column $X_2$ vertical lines 50 through 53 are disposed over card columns 1 through 3 and 80, the lines for card columns 4 through 79 being omitted. Resistors 54 through 57 are connected between respective lines 50 through 53 to an input terminal 58, and the value of the resistors 54 through 57 is the same as the value of the resistors 44 through 47. A signal applied to the input terminal 58 of the column $X_2$ is divided equally between the lines 50 through 53.

In column $X_3$ vertical lines 60 through 63 are disposed over respective card columns 1 through 3 and 80 of the cards 12, 16, 20 and 24. Resistors 64 through 67 are connected between respective lines 60 through 63 and an input terminal 68. The value of the resistors 64 through 67 is the same as the value of the resistors 44 through 47. A signal applied to the input terminal 68 is divided equally between the lines 60 and 63.

Vertical lines 70 through 73 in column $X_n$ are disposed over card columns 1 through 3 and 80 of the cards 13, 17, 21 and 25. Resistors 74 through 77 are connected between respective lines 70 through 73 and an input terminal 78. The value of the resistors 74 through 77 is the same as the value of the resistors 44 through 47. A signal applied to the terminal 78 is divided equally between the lines 70 through 73. The signals applied to the lines $X_1$ through $X_n$ are equal in amplitude.

The vertical lines 40 through 43 in column $X_1$ are connected to lines 80 through 83 through respective diodes 90 through 93. Vertical lines 50 through 53 in column $X_2$ are connected to the lines 80 through 83 through respective diodes 100 through 103. The vertical lines 60 through 63 in column $X_3$ are connected through respective diodes 110 through 113 to the lines 80 through 83. The vertical lines 70 through 73 in column $X_n$ are connected through respective diodes 120 through 123 to the lines 80 through 83. The lines 80 through 83 are connected to respective sense amplifiers 130 through 133. The lines 80 through 83 are connected through respective resistors 140 through 143 to ground.

A line 150 is connected through respective diodes 151 through 166 to associated vertical lines 40 through 43, 50 through 53, 60 through 63 and 70 through 73. As explained more fully hereinafter, a signal is applied to the line 150 for the purpose of neutralizing the charge on capacitors associated with the vertical lines of a selected column after a reading operation is performed.

The memory device in FIG. 1 is employed for reading purposes only. The cards employed in FIG. 1 are punched and fabricated, as illustrated and described in the above-mentioned copending application, before being placed in the circuits of FIG. 1. Information represented by the presence or absence of a hole in the cards of FIG. 1 is permanently stored, and it may be read nondestructively as often as needed.

Information is read from a given row of a selected card by energizing a selected X and Y line. For example, information in row 1 of card 10 may be read by energizing the terminal 48 of column $X_1$ and the $Y_1$ line. If it is desired to read row 12 of the card 19, this may be accomplished by energizing the terminal 58 of the column $X_2$ and the $Y_{36}$ line. It is readily seen therefore that any row of any card may be read by the energization of appropriate Y line and X lines.

For a given read operation, only one of the X columns is selected, the remaining columns being unselected or not energized. For this reason all vertical lines associated with the same numbered card column may be interrogated by a single sense amplifier. For example, line 40 in column $X_1$, the line 50 in column $X_2$, the line 60 in column $X_3$ and the line 70 in column $X_n$ are connected through respective diodes 90, 100, 110 and 120 along the line 80 to the sense amplifier 130. It is pointed out that a signal on the selected vertical line back biases the diodes in the unselective vertical lines. For example, if column $X_1$ is selected for a read operation, the signal on the line 40 is passed by the diode 90 to the sense amplifier 130, and the signal which passes the diode 90 back biases the diodes 100, 110 and 120. Since the diodes 100, 110 and 120 are back biased, any signals coupled through holes of unselected cards in the selected row to unselected vertical lines are inhibited from reaching the sense amplifiers. This reduces noise and improves the signal-to-noise ratio of the selected vertical lines.

For the purpose of illustrating a read operation in the memory array of FIG. 1, let it be assumed that information in row 12 of the card 19 is to be extracted. The sequence in which signals are applied to operate the memory array in FIG. 1 is illustrated in FIG. 2. First, a signal such as illustrated in FIG. 2*a* is applied to the terminal 58 of the selected column $X_2$ in FIG. 1. This signal is passed by the diodes 100 through 103 along the lines 80 through 83 to the sense amplifiers 130 through 133. The signal on the lines 80 through 83 is inhibited from reaching the vertical lines 40 through 43, 60 through 63 and 70 through 73 by respective diodes 90 through 93, 110 through 113 and 120 through 123 because the polarity of the signal is opposite to that required to make these diodes conduct. Accordingly, the diodes 90 through 93, 110 through 113 and 120 through 123 offer a high impedance to the signals on the lines 80 through 83, and the signal on these lines is conveyed to the sense amplifiers only. The signal indicated in FIG. 2*a* represents the amplitude of the signal on each of the lines 50 through 53. The signal applied to the terminal 58 of the selected column $X_2$ is a large signal which is devided into equal parts by the resistors 54 through 57 which have equal values as pointed out earlier. Thus the signals on the line 50 through 53 are equal in magnitude.

Next, a signal is applied to the selected Y line which, in this instance is the line $Y_{36}$. The signal applied to the line $Y_{36}$ is indicated in FIG. 2*b*. Wherever there is a hole in the row 12 of the card 19 there is capacitively coupled to the associated vertical line a portion of the signal on the line $Y_{36}$. For purposes of illustration holes are depicted in columns 2 and 80 of row 12 of the card 19. A metal plate within the card 19 prevents coupling between the line $Y_{36}$ and the vertical lines 50 and 52. Consequently, the signals on the lines 50 and 52 are applied to respective sense amplifiers 130 and 132 without a change in amplitude. The signals on the lines 51 and 53 are increased in amplitude because a portion of the signal on the $Y_{36}$ is capacitively coupled through the holes in columns 2 and 80 of row 12 of the card 19. The signal coupled through each of these holes to the associated vertical lines is substantially as indicated in FIG. 2*b*. A metal plate is employed within the card, and this construction is illustrated and described in the above-mentioned copending application. As pointed out in this copending application, the impedance of the selected vertical lines undergoes a very negligible change from the case where there are no holes in a selected row of a card to the case where there are many holes in the selected row of a card. This condition is obtained by employing a capacitor $C_x$ between each vertical line and ground which is substantially larger than the capacitor between each vertical line coupled through a hole to a horizontal line. Accordingly, the variations in the coupling capacitors through holes in the cards has negligible effect on the capacitor $C_x$ between each vertical line and ground. The capacitor $C_x$ may be an inherent capacitor or an added capacitor.

Next, a sample pulse such as illustrated in FIG. 2*c* is applied to a line 170 in FIG. 1, and this pulse is applied to each of the sense amplifiers 130 through 133. Since there is no hole in the card column 1 of row 12 of the card 19, the signal applied on the line 80 to the sense amplifier 130 has the magnitude of the signal illustrated in FIG. 2*a*. Likewise, a signal of this same magnitude is applied on the line 82 to the sense amplifier 132. The sense amplifiers 130 and 132 do not pass the sample pulse on the line 170 because the amplitude of the signal in FIG. 2*a* is not sufficient to condition the sense amplifiers 130 and 132. The vertical lines 51 and 53 of the selected column $X_2$ are disposed over holes in rows 2 and 80 of row 12 of the card 19, and portions of the signal on the line $Y_{36}$ are coupled to these lines. The amplitude of the signal coupled to each line is indicated in FIG. 2*b*. These signals are in an additive relationship so that the signal applied on the lines 81 and 83 to respective sense amplifiers 131 and 133 is the sum of the two signals indicated in FIG. 2*a* and FIG. 2*b*. The amplitude of this signal is sufficient to condition a sense amplifier to pass a sample pulse on the line 170. Accordingly, the sense amplifiers 131 and 133 are conditioned to pass the sample pulse on the line 170. It is seen therefore that the output lines 171 and 173 of respective sense amplifiers 130 and 132 undergo no change in signal level and a binary zero is represented by the output signal from each of these sense amplifiers. The output lines 172 and 174 of respective sense amplifiers 131 and 133 undergo a change in signal level, and this represents binary one. Accordingly, the binary information read from row 12 of the card 19 is 0101 from respective columns 1 through 3 and 80. As soon as the sample pulse on the line 170 is terminated the signal on the line $Y_{36}$ may be terminated, subsequent to which the signal on the column $X_2$ may be terminated. The terminations of these signals are preferably accomplished as indicated by the waveforms shown in FIGURES 2*a* through 2*c*.

The capacitors $C_x$ of the selected vertical lines 50 through 53 remain charged after the signal applied to the terminal 58 of the column $X_2$ is terminated. For the purpose of neutralizing this charge and immediately rendering these lines capable of being used again, a pulse such as indicated in FIG. 2*d* is applied to the line 150 in FIG. 1. This pulse is coupled through the diodes 155 through 158 to associated vertical lines 50 through 53, and since the polarity of the pulse on the line 150 is opposite to that earlier applied to the terminal 59 of the seletced column $X_2$, the capacitors $C_x$ are effectively neutralized by the application of an opposite charge. Accordingly, the vertical lines 54 through 57 are ready for use in case the column $X_2$ is selected for the next read operation.

Reference is made to FIG. 3 for an illustration of another embodiment of a memory array employed to read information capacitively through perforated cards. The same reference numerals are used in FIG. 3 to designate like parts shown in FIG. 1. The memory arrangement in FIG. 3 is similar to that in FIG. 1 except vertical lines 200 through 203 in respective columns $X_1$ through $X_n$ are added and the sense amplifiers employed are differential amplifiers. The lines 200 through 203 are connected through respective resistors 210 through 213 to corresponding terminals 48, 58, 68, and 78 of associated columns $X_1$ through $X_n$. The lines 200 through 203 are connected through associated diodes 220 through 223 to a line 224 which is connected as a second input to differential amplifiers 230 through 233. The differential amplifiers 230 through 233 have corresponding output lines 240 through 243, and signals on these output lines represent binary information in the same manner as earlier discussed with respect to FIG. 1.

For purposes of illustration, let it be assumed that information is to be read, as before, from row 12 of the card 19 in FIG. 3 and that columns 2 and 80 of this row have holes as illustrated in FIG. 3. The card memory array in FIG. 3 is interrogated by applying signals to the terminal 58 of the selected column $X_2$ and the line $Y_{36}$. The signal which appears on each of the vertical lines 50 through 53 and 201 as a result of the signal applied to the terminal 58 is indicated in FIG. 4*a*. The signal on the line 201 is applied as one input to all of the differential amplifiers 230 through 233. Since there are no holes in the card columns 1 and 3 of row 12 of the card 19, the signals on the vertical lines 50 and 52 are not changed by the signal on the selected line $Y_{36}$; whereupon, the signals conveyed to associated differential amplifiers 230 and 232 along respective lines 80 and 82 have the same amplitude as the signals applied to these differential amplifiers on the line 224. Consequently, the differential amplifiers 230 and 232 provide no change in output signal because both input signals have the same amplitude. Since the vertical lines 51 and 53 are capacitively coupled through holes in the card 19 to the selected line $Y_{36}$, a signal is coupled from the selected line $Y_{36}$ to the vertical lines 51 and 53. The signal on the selected line $Y_{36}$ which is coupled to the vertical lines 51 and 53 is shown in FIG. 4*b*. The signals on the lines 51 and 53 are applied through respective lines 81 and 83 to associated differential amplifiers 231 and 233. The signals which appear on the output lines 241 and 243 of respective differential amplifiers 231 and 233 are such as indicated in FIG. 4*c*. The signal in FIG. 4*c* represents that portion of the signal on the line $Y_{36}$ coupled through the holes of the card 19 to the vertical lines 51 and 53. The differential amplifiers 231 and 233 provide an output signal having an amplitude equal to the difference of the two input signals. For example, the difference between the amplitude of the signal on the vertical line 201 and the amplitude of the signal on the vertical line 51 is equal to the magnitude of the signal coupled from the line $Y_{36}$ to the line 51, and this difference is indicated at the output line 241 of the differential amplifier 231. In like fashion the signal on the output line 243 of the differential amplifier 233 is equal to the difference of the signals on the vertical line 201 and 53, this difference being equal to the portion of the signal coupled from the line $Y_{36}$ to the vertical line 53 through the hole in the card 19. The signals to the terminal 58 and the line $Y_{36}$ are terminated, in the manner indicated in FIGURES 4*a* and 4*b*, and then a signal having a polarity opposite to that applied to the terminal 58 is established on the line 150 for the purpose of neutralizing the charge in the inherent capacitances of the selected lines 50 through 53 and 201. Additional diodes 250 through 253 are connected between associated vertical lines 200 through 203 to the line 150. The diode 251 is effective in this instance to couple the signal from the line 150 to the line 201 for the purpose of neutralizing the charge in the inherent capacitance $C_x$ of the line 201. As soon as the signal on the line 150 is terminated the next readout operation may be initiated. It is pointed out that the arrangement in FIG. 3 does not require a sample pulse to interrogate the sense amplifiers as was needed in FIG. 1.

In order to demonstrate the speed which may be obtained for read out operations of the card memory illustrated in FIGURES 1 and 3, reference is made to FIG. 5 which illustrates the equivalent circuit of the vertical lines 40 and 41 associated with column $X_1$. The circuit components in FIG. 5 are designated with the same reference numerals as employed in FIG. 1. It is pointed out that the condensers $C_x$ may be the inherent capacitance of the lines 40 and 41, but if the inherent capacitance is not adequate, actual condensers may be connected to the lines 40 and 41. As pointed out earlier, the condensers $C_x$ are made substantially greater than the coupling capacitances existing between vertical and horizontal lines disposed on opposite sides of a hole in the metal plate of a card. The output voltage $V_0$ may be designed by the equation $$V_0=E_0\left(1-e^{-\frac{t}{RC_x}}\right) \qquad (1)$$

where R is either resistor 44 or 45. For the circuit in FIG. 5, $RC_x$=.3 microseconds. Since the diodes 90 and 91 conduct at about one-half of a volt, a relatively large voltage, say 100 volts, is selected for input voltage $E_0$ to the terminal 48 for the purpose of making the diodes conduct rapidly and thereby energizing the sense amplifiers 130 and 131. For values of time $t$ which are much, much smaller than $RC_x$, Equation 1 becomes $$V_0=\frac{E_0t}{RC_x} \qquad (2)$$

and therefore $$t=\frac{RCV_0}{E_0} \qquad (3)$$

For the case where $E_0=100$ volts and $V_0=1$ volt, then $t=3$ nanoseconds. Accordingly, it is seen that the signals on the selected vertical lines 40 and 41 may energize or condition the sense amplifiers 130 and 131 in approximately 3 nanoseconds, and immediately thereafter the signal on the selected Y line may be effective to operate the sense amplifiers 130 and 131. The signal on the selected horizontal line is comparable in speed to those signals on the selected vertical line, and it is seen that the total time necessary to retrieve data is in the order of tens of nanoseconds.

The differential amplifiers shown in block form in FIG. 3 and the sense amplifiers shown in block form in FIG. 1 are not illustrated and described in detail since many suitable circuits of this type are well known in the art.

It is seen therefore that novel card-capacitor memory arrangements utilizing punched cards are provided which may be operated at high speeds, and the number of cards employed, while variable in number, may be increased so that a large volume of data may be permanently stored. The number of circuit components employed to supply operating signals to the X and Y lines is minimized, thereby reducing the cost of manufacture. Furthermore, the signal to noise ratio is favorably large because nonselected vertical lines have diodes which are reverse biased for the purpose of reducing noise signals.

While the invention has been particularly shown and described with reference to preferred embodiments thereof, it will be understood by those skilled in the art that various changes in form and details may be made therein without departing from the spirit and scope of the invention.

What is claimed is:

A card-capacitor memory matrix including a plurality of cards arranged in columns and rows, each card containing data manifesting perforations therein arranged in columns and rows, Y horizontal lines disposed on one side of the cards in alignment with the rows of the cards, X groups of vertical lines, one group of vertical lines for each column of the matrix, disposed on the opposite side of the cards in alignment with the columns of the cards, sensing means coupled to corresponding vertical lines of each group of vertical lines responsive to a signal on a selected vertical line for indicating information, diode means coupled between each vertical line and the associated sensing means for reducing unwanted or noise signals, and further diode means coupled to each vertical line and responsive to a signal having a polarity opposite to that applied to the selected X column for neutralizing any capacitive charge associated with the selective group of vertical lines.

References Cited by the Examiner

UNITED STATES PATENTS

| | | | |
|---|---|---|---|
| 2,843,838 | 7/58 | Abbott | 340—174 |
| 2,844,811 | 7/58 | Burkhart | 340—166 |
| 3,003,143 | 10/61 | Burrier | 340—173 |
| 3,077,591 | 2/63 | Akmenkalns | 340—173 |
| 3,090,833 | 5/63 | Zenner | 235—61.11 |

OTHER REFERENCES

Publication: IBM Technical Disclosure Bul. "Read Only Memory" by Ordermann, vol. 4, #3, August 1961, pp. 23–24.

IRVING L. SRAGOW, *Primary Examiner.*